Nov. 7, 1939.　　　　L. N. NICCOLLS　　　　2,178,862
ELECTRICAL HEATER FOR SOLDERING IRONS
Filed June 20, 1938

Inventor
Lester N. Niccolls
By Charles L. Reynolds
Attorney

Patented Nov. 7, 1939

2,178,862

UNITED STATES PATENT OFFICE 2,178,862

ELECTRICAL HEATER FOR SOLDERING IRONS

Lester N. Niccolls, near Seattle, Wash.

Application June 20, 1938, Serial No. 214,713

2 Claims. (Cl. 219—23)

My invention concerns a heater for a soldering iron, particularly one by the use of which the iron will be heated by electrical means which are independent of the iron itself, and not incorporated therein, and which heating means are portable and capable of being connected into any convenient source of current, such as the ordinary 110-volt house lighting circuit.

It is one of the particular objects of my invention to devise such a heater which will be comparatively light and convenient for carrying, and in which there are no moving parts whatsoever, and therefore which is rugged and simple to use.

It is a further object to provide such a heater for a soldering iron or the like which is simply constructed and convenient to use, one which will be safe in that no heavy current flows and no heat is generated except at such times as the soldering iron is properly placed in position in the heater, one which has means to position the soldering iron definitely in proper position to be heated, and to support it in that position, and in general a device of the character described which is simple, convenient, rugged and little likely to get out of order.

My invention comprises the novel heater and the novel arrangement of the parts thereof, and relative to a soldering iron, such as is shown in the accompanying drawing, described in the specification, and as will be more particularly defined by the claims which terminate the same.

In the accompanying drawing I have shown my invention embodied in a form which is at present preferred by me, it being understood that various changes may be made in the form, character, and arrangement of the parts, and in the composition of certain parts, as will appear more fully hereafter.

Essentially the heater comprises two electrodes of a material which is capable of being highly heated by the passage of currents of high amperage and low voltage (a suitable material being carbon), which electrodes are fixedly supported in fixed-apart relationship, and connected to opposite terminals of a source of suitable current, such a source being conveniently the secondary of a step-down transformer. The whole is conveniently carried by or fixed within a suitable framework, with parts so arranged that the heat generated is not conveyed nor conducted to the transformer, and preferably also so arranged that the soldering iron, when in operative position bridging the space between the two electrodes, is suitably supported in this position. In particular a support is provided for the handle end of the soldering iron, which will hold its working head in proper position between the electrodes, and this support may form a convenient carrying handle. More especially, according to my invention, the electrodes are fixedly supported with relation to each other and to the frame, not adjustably, and their adjoining faces are formed in a special manner, namely, they are oppositely inclined to form a V-notch, which is of sufficient width at the top to permit the passage of the head of the soldering iron, but of insufficient width at the bottom to permit the soldering iron to pass through, so that the soldering iron head is wedged in place by its own weight between the walls of the V-notch thus formed. When so positioned the soldering iron completes the circuit between the two electrodes, and causes them and itself to be heated. Only then does current flow in the secondary circuit. The electrodes are supported by an insulating support which is electrically insulating and preferably refractory to heat.

Figure 3:
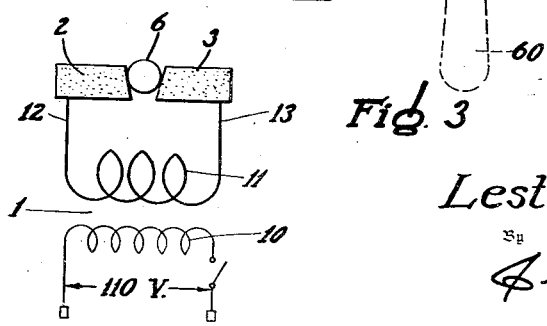
Figure 3 is a diagram of the electrical circuits embodied in the device.

The transformer is indicated at 1. The primary 10 (Figure 3) may be connected to the ordinary 110-volt house lighting circuit, and its secondary 11 is provided with leads 12 and 13 connecting to the terminals 2 and 3, which are of a material, such as carbon, having a sufficiently high resistance to the low voltage, high amperage current flowing through the secondary that they become heated and in turn heat the head 6 to a sufficient degree.

The whole (the transformer 1 and the terminals 2 and 3) may be supported in a suitable frame, generally indicated at 4, this frame supporting an insulating support 5, to which the terminals 2 and 3 are fixedly secured, as by the clips 20, 30, in spaced apart relation. The support 5 is of electrical insulating material, and preferably is of heat refractory material, such as porcelain. The frame at one end, preferably at the end opposite the electrodes 2 and 3, is provided with or formed as an arch 41 upstanding above the transformer, and at such a level as to serve as a convenient support for the handle 60 of a soldering iron, the head 6 of which, as previously stated, is inserted in the gap between the adjoining faces of the electrodes 2 and 3.

Figure 1:
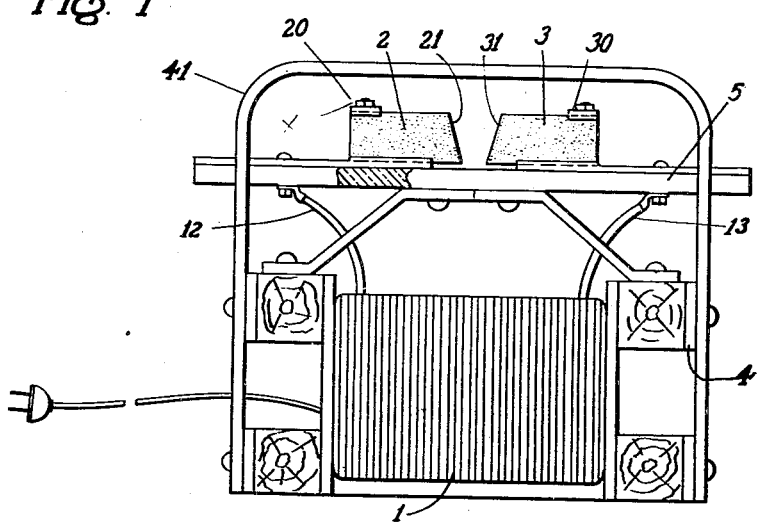
Figure 1 is an end elevation of the device complete.
Figure 2:
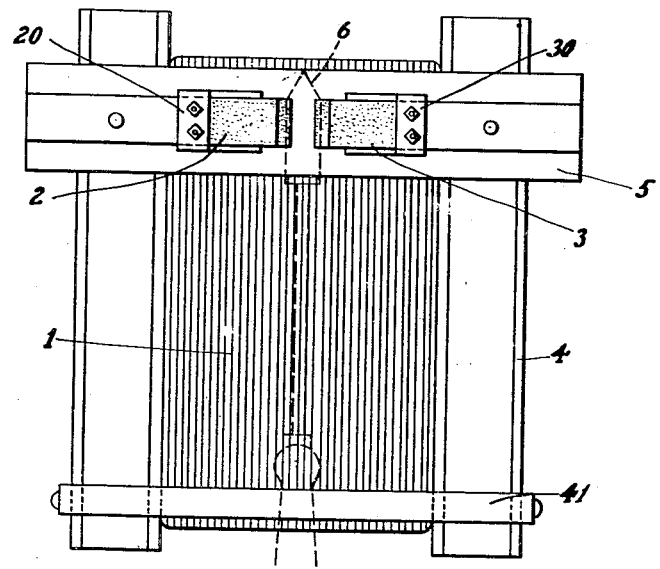
Figure 2 is a plan view of the same.

These faces 21 and 31, as is well shown in Figure 1, are formed oppositely inclined, so that the gap between them is wider at the top than at the bottom. At the top the width is sufficient to admit the head 6 of the soldering iron to be used, and at the bottom the width is insufficient to permit the head 6 to pass through; indeed, it may be of insufficient width to permit a smaller head passing through. Now when a soldering iron is supported with its head in the V-notch between the faces 21, 31, and with its handle 69 resting upon the carrying handle 41, the head 6, which is actually of copper alloy or like metal of high electric conductivity, completes the circuit through the secondary of the transformer, that is, between the electrodes 2 and 3, and these begin to heat up and to heat the head 6 by the passage of current. When the heating has progressed to a sufficient degree the soldering iron is lifted out of the V-notch, whereupon the flow of current ceases.

Another soldering iron, which is to be used next, may rest its head upon one or the other of the electrodes 2 and 3, while the first iron is being heated, and this head, resting only upon one of the electrodes, is heated only by heat conduction from the electrode, to some degree, or is kept warm, so that it will take less time to heat it when it, in its turn, is disposed between the two electrodes. The electrodes may be similarly used to heat other devices which are of material that will conduct electricity; for instance, a cold chisel to be tempered may be rested within the V-notch, and will bridge the gap between the electrodes and close the secondary circuit, and thus will become heated. The device, however, is particularly intended and devised for the heating of soldering irons. It can be carried from place to place, and is safe in that current does not flow through the secondary except when an iron is properly positioned in place in the V-notch.

What I claim as my invention is:

1. Means to heat a soldering iron or the like, comprising a transformer the secondary whereof constitutes a source of current of high amperage and low voltage, a frame supporting the transformer, a single insulating support carried upon the top of the frame, a pair of electrode blocks of carbon or the like connected to opposite terminals of the secondary, and both resting upon and fixedly supported on said insulating support, with adjoining faces spaced apart and oppositely inclined to define a V-notch, of sufficient width at its top to admit the soldering iron, but of insufficient width at its bottom to permit the iron to pass through, whereby the circuit is completed through the electrodes, and the latter and the iron are heated, only when the iron rests in the V-notch.

2. A portable means to heat a soldering iron or the like, comprising a transformer the secondary whereof constitutes a source of current of high amperage and low voltage, a skeleton frame of spaced apart members supporting the transformer, a single support of electrical insulating and heat refractory material carried by the frame, spaced above the transformer, a pair of carbon electrodes connected to opposite terminals of the secondary, and each resting upon and fixedly supported on the upper surface of said insulating support, with adjoining faces spaced apart and oppositely inclined to define a V-notch, of sufficient width at the top to admit the soldering iron, but of insufficient width at its bottom to permit the iron to pass through, whereby the iron is wedged in place when laid in said V-notch, and thus completes the secondary circuit, and one of said frame members extending upwardly above and across the transformer to constitute a carrying handle disposed at a level to serve as a rest for the handle of the iron, and to maintain the iron in proper position within the V-notch.

LESTER N. NICCOLLS.